United States Patent
Shin et al.

(10) Patent No.: US 11,022,845 B2
(45) Date of Patent: Jun. 1, 2021

(54) STACK AND LIQUID CRYSTAL DISPLAY DEVICE INCLUDING SAME

(71) Applicant: LG CHEM, LTD., Seoul (KR)

(72) Inventors: Nayoung Shin, Anyang-si (KR); Junwon Chang, Daejeon (KR); Moon Soo Park, Daejeon (KR); Kyun Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/758,369

(22) PCT Filed: Jun. 4, 2019

(86) PCT No.: PCT/KR2019/006713
§ 371 (c)(1),
(2) Date: Apr. 22, 2020

(87) PCT Pub. No.: WO2019/235809
PCT Pub. Date: Dec. 12, 2019

(65) Prior Publication Data
US 2020/0326573 A1    Oct. 15, 2020

(30) Foreign Application Priority Data
Jun. 5, 2018 (KR) .................. 10-2018-0064884

(51) Int. Cl.
*G02F 1/13363* (2006.01)
*G02F 1/1335* (2006.01)
*G02F 1/1337* (2006.01)

(52) U.S. Cl.
CPC ........ *G02F 1/13363* (2013.01); *G02F 1/1337* (2013.01); *G02F 1/133528* (2013.01); *G02F 1/133638* (2021.01)

(58) Field of Classification Search
None
See application file for complete search history.

(56) References Cited

U.S. PATENT DOCUMENTS

| | | |
|---|---|---|
| 2005/0151896 A1 | 7/2005 | Hara et al. |
| 2006/0203159 A1 | 9/2006 | Kawamoto et al. |
| 2007/0024780 A1 | 2/2007 | Kim et al. |
| 2009/0002609 A1 | 1/2009 | Okita et al. |
| 2010/0149459 A1 | 6/2010 | Yabuta et al. |

(Continued)

FOREIGN PATENT DOCUMENTS

| | | |
|---|---|---|
| JP | 2006-268007 A | 10/2006 |
| JP | 2009-003432 A | 1/2009 |

(Continued)

OTHER PUBLICATIONS

KR 2007035822 A, Hong et al. translation (Year: 2007).*

*Primary Examiner* — James A Dudek
(74) *Attorney, Agent, or Firm* — Dentons US LLP (57) ABSTRACT

This application relates to a laminate which comprises: a first polarization rotation layer; a second polarization rotation layer; and a positive C plate provided between the first polarization rotation layer and the second polarization rotation layer, the first polarization rotation layer comprises a first half wave plate and a first quarter wave plate, and the second polarization rotation layer comprises a second half wave plate and a second quarter wave plate and a liquid crystal display comprising the same.

18 Claims, 4 Drawing Sheets

(56) References Cited

U.S. PATENT DOCUMENTS

2012/0249931 A1    10/2012   Tamaki et al.
2013/0050618 A1    2/2013   Lo et al.
2015/0070764 A1    3/2015   Hatanaka et al.

FOREIGN PATENT DOCUMENTS

| | | |
|---|---|---|
| JP | 2009-031402 A | 2/2009 |
| JP | 2012-208212 A | 10/2012 |
| JP | 2015-040904 A | 3/2015 |
| JP | 6175972 B2 | 3/2015 |
| JP | 2018-060152 A | 4/2018 |
| KR | 10-2004-0097373 A | 11/2004 |
| KR | 2007035822 A * | 4/2007 ............... G02F 1/13 |
| KR | 10-2007-0081259 A | 8/2007 |
| KR | 10-2013-0074878 A | 7/2013 |
| KR | 10-1293564 B1 | 8/2013 |
| KR | 10-2015-0029562 A | 3/2015 |
| KR | 10-2015-0122410 A | 11/2015 |
| KR | 10-2016-0112380 A | 9/2016 |

* cited by examiner

STACK AND LIQUID CRYSTAL DISPLAY DEVICE INCLUDING SAME

The present application is a National Phase entry pursuant to 35 U.S.C. § 371 of International Application No. PCT/KR2019/006713 filed on Jun. 4, 2019, and claims priority to and the benefit of Korean Patent Application No. 10-2018-0064884 filed in the Korean Intellectual Property Office on Jun. 5, 2108, the entire contents of which are incorporated herein by reference.

FIELD

This application relates to a laminate and a liquid crystal display comprising the same.

BACKGROUND

In recent years, as there has been a growing interest in information displays and demand for portable information medium to be used has increased, research and commercialization of a lightweight thin film flat panel display (FPD), which replaces an existing cathode ray tube (CRT) display device have been mainly carried out. In particular, among such flat panel display devices, a liquid crystal display (LCD) as a device for displaying an image using optical anisotropy of a liquid crystal is excellent in resolution, color display, and image quality and is actively applied to a notebook or a desktop monitor.

In such a liquid crystal display, liquid crystal molecules of a liquid crystal layer are driven by a difference in voltage applied to a common electrode and a pixel electrode.

Liquid crystals have features such as dielectric anisotropy and refractive anisotropy. Dielectric anisotropy means that the degree of polarization induced by an electric field varies depending on long axis and short axis directions of the liquid crystal and the refractive anisotropy means that a refractive index varies depending on the long axis and short axis directions of the liquid crystal, which causes a polarization state to be changed because the refractive index perceived varies according to a direction when light passes through the liquid crystal molecules.

As a result, the liquid crystal display has a liquid crystal panel constituted by a pair of transparent insulating substrates formed by planes facing each other with the liquid crystal layer interposed therebetween as a required component and arbitrarily controls the polarization of the liquid crystal molecules through a change in electric field between respective electric field generating electrodes, and displays various images by using transmittance of light which is changed at this time.

In this case, a polarizer is located at each of upper and lower portions of the liquid crystal panel and the polarizer transmits the light of a polarization component, which coincides with a transmission axis, to determine a transmission degree of light by arrangement of transmission axes of two polarizers and arrangement characteristics of the liquid crystals.

The polarizer used in the liquid crystal display in the related art is mainly a PVA elongated type in which iodine ions are aligned through stretching by using polyvinyl alcohol (PVA) having good adsorption ability with iodine.

This application has been made in an effort to provide a liquid crystal display capable of resolving a size limitation of a polarizer and having an enhanced front contrast ratio (CR) characteristic.

SUMMARY

An embodiment of this application provides a laminate which comprises: a first polarization rotation layer; a second polarization rotation layer; and a positive C plate provided between the first polarization rotation layer and the second polarization rotation layer, wherein the first polarization rotation layer comprises a first half wave plate and a first quarter wave plate, and wherein the second polarization rotation layer comprises a second half wave plate and a second quarter wave plate.

Further, another embodiment of this application provides a liquid crystal display which comprises: an upper polarizer; a lower polarizer; and a liquid crystal panel provided between the upper polarizer and the lower polarizer; wherein the upper polarizer and the lower polarizer are provided so that absorption axes are parallel to each other; wherein the liquid crystal display sequentially comprises a first polarization rotation layer and a positive C plate; and the liquid crystal display further comprising a second polarization rotation layer between the upper polarizer and the liquid crystal panel; wherein the first polarization rotation layer comprises a first half wave plate and a first quarter wave plate, the second polarization rotation layer comprises a second half wave plate and a second quarter wave plate, and wherein the liquid crystal panel is a vertical alignment liquid crystal mode.

According to an embodiment of the present application, absorption axes of an upper polarizer and a lower polarizer of a liquid crystal display are provided parallel to each other, thereby resolving a size limitation of a polarizer according to a width of a polarizer raw material.

Further, according to an embodiment of this application, a first polarization rotation layer, a positive C plate, and a second polarization rotation layer are provided between an upper polarizer and a liquid crystal panel, and as a result, black luminance is reduced due to scattering of side light to increase a front (CR) as compared with a case where the first polarization rotation layer, the positive C plate, and the second polarization rotation layer are provided between a lower polarizer and the liquid crystal panel.

Further, according to an embodiment of this application, the positive C plate is provided between the first polarization rotation layer and the second polarization rotation layer to minimize reduction of a (CR) at a viewing angle.

EXPLANATION OF REFERENCE NUMERALS AND SYMBOLS

10: Upper polarizer
20: Lower polarizer

30: Liquid crystal panel
40: First half wave plate
50: First quarter wave plate
60: Positive C plate
70: Second half wave plate
80: Second quarter wave plate
90: Negative B plate

DETAILED DESCRIPTION

Hereinafter, preferred embodiments of the present application will be described. However, the embodiments of the present application may be modified into various other forms, and the scope of the present application is not limited to the embodiments described below. Further, the embodiments of the present application are provided for more completely describing the present application to those having average knowledge in the art.

In this specification, a case where a part "comprises" an element will be understood to imply the inclusion of stated elements but not the exclusion of any other elements unless explicitly described to the contrary.

In a liquid crystal display in the related art, an absorption axis of any one polarizer of an upper polarizer and a lower polarizer is set to 0 degree and the absorption axis of the other one polarizer is set to 90 degrees and the absorption axes of the upper polarizer and the lower polarizer are orthogonal to each other. However, when the absorption axis of the polarizer is 90 degrees, a horizontal length of the polarizer is limited by a width of a roll of material that is used to manufacture the polarizer, which becomes a limiting factor for enlarging a product size. A maximum width of the roll that is used to manufacture a current polarizer is approximately 2600 mm, which means that a maximum size of a 21:9 standard TV is approximately 110 inches.

In order to improve the limitation on the size of such a polarizer, a method for transversely stretching a polyvinyl alcohol (PVA) film to form the absorption axis of a polarizer roll in the transverse direction TD is proposed. However, even in such a case, unevenness due to lowering of the uniformity of the transverse stretching may occur and the degree of polarization due to the lowering of a stretching ratio may be reduced.

Thus, in this application, the absorption axes of the upper polarizer and the lower polarizer of the liquid crystal display are all set to 0 degree, thereby resolving the size limitation of the polarizer according to the width of the polarizer raw material.

A laminate according to an embodiment of this application comprises: a first polarization rotation layer; a second polarization rotation layer; and a positive C plate provided between the first polarization rotation layer and the second polarization rotation layer, the first polarization rotation layer comprises a first half wave plate and a first quarter wave plate, and the second polarization rotation layer comprises a second half wave plate and a second quarter wave plate.

Further, a liquid crystal display according to an embodiment of this application comprises: an upper polarizer; a lower polarizer; and a liquid crystal panel provided between the upper polarizer and the lower polarizer, the upper polarizer and the lower polarizer are provided so that absorption axes are parallel to each other, the liquid crystal display sequentially comprises the first polarization rotation layer, the positive C plate, and the second polarization rotation layer between the upper polarizer and the liquid crystal panel, the first polarization rotation layer comprises the first half wave plate and the first quarter wave plate, the second polarization rotation layer comprises the second half wave plate and the second quarter wave plate, and the liquid crystal panel is a vertical alignment liquid crystal mode.

In an embodiment of this application, the upper polarizer and the lower polarizer are provided such that the absorption axes thereof are parallel to each other. As described above, both of the absorption axes of the upper polarizer and the lower polarizer may be 0 degree in order to resolve the size limitation of the polarizer according to a width of a polarizer raw material.

In an embodiment of this application, the case where the liquid crystal display comprises the first polarization rotation layer, the positive C plate, and the second polarization rotation layer between the upper polarizer and the liquid crystal panel is more preferable than the case where the liquid crystal display comprises the first polarization rotation layer, the positive C plate, and the second polarization rotation layer between the lower polarizer and the liquid crystal panel.

In an embodiment of this application, in regard to the upper polarizer and the lower polarizer, the polarizer attached to a TFT glass surface, which is a lower portion of the liquid crystal panel, based on the liquid crystal panel, is referred to as the lower polarizer and the polarizer attached to an upper portion of the liquid crystal panel which is the opposite side thereof is referred to as the upper polarizer.

Light emitted from a backlight unit (BLU) and incident on the lower polarizer has a black luminance rising element at the front due to scattering inside a cell in a lower panel. In this case, scattered light may be absorbed by the polarizer of an upper plate as long as there is no retardation of a lower plate. So that, as compared with the case where the liquid crystal display comprises the first polarization rotation layer, the positive C plate, and the second polarization rotation layer between the lower polarizer and the liquid crystal panel, when the liquid crystal display comprises the first polarization rotation layer, the positive C plate, and the second polarization rotation layer between the upper polarizer and the liquid crystal panel, the black luminance is reduced due to side light scattering, and as a result, a front CR is raised.

In an embodiment of this application, the first quarter wave plate of the first polarization rotation layer may be provided on the positive C plate, and the second quarter wave plate of the second polarization rotation layer may be provided on the positive C plate.

Therefore, the laminate according to an embodiment of this application may be a lamination structure of the first half wave plate/the first quarter wave plate/the positive C plate/the second quarter wave plate/the second half wave plate. Further, the liquid crystal display according to an embodiment of this application may be a lamination structure of the upper polarizer/the first half wave plate/the first quarter wave plate/the positive C plate/the second quarter wave plate/the second half wave plate/the liquid crystal panel/the lower polarizer.

In an embodiment of this application, an angle formed between an optical axis of the first half wave plate of the first polarization rotation layer and the absorption axis of the upper polarizer may be 10 to 20 degrees, and may be 12.5 to 17.5 degrees. The angle between the optical axis of the first quarter wave plate of the first polarization rotation layer and the absorption axis of the upper polarizer may be 70 to 80 degrees, and may be 72.5 to 77.5 degrees.

Further, in an embodiment of this application, the angle formed between the optical axis of the second quarter wave plate of the second polarization rotation layer and the absorption axis of the upper polarizer may be 10 to 20 degrees, and may be 12.5 to 17.5 degrees. The angle formed between the optical axis of the second half wave plate of the second polarization rotation layer and the absorption axis of the upper polarizer may be 70 to 80 degrees, and may be 72.5 to 77.5 degrees.

When the angle deviates from the angle, 90-degree linearly polarized light conversion may not be made (e.g., 0 degree→90 degrees), and as a result, the optical axis is not orthogonal to the absorption axis of the upper polarizer and light leakage occurs in black and the CR thus drops. As an ideal optical axis angle, the angle formed between the optical axis of the first half wave plate of the first polarization rotation layer and the absorption axis of the upper polarizer is 15 degrees and the angle formed between the optical axis of the first quarter wave plate and the absorption axis of the upper polarizer is 75 degrees. Further, as the ideal optical axis angle, the angle formed between the optical axis of the second quarter wave plate of the second polarization rotation layer and the absorption axis of the upper polarizer is 15 degrees and the angle formed between the optical axis of the first half wave plate and the absorption axis of the upper polarizer is 75 degrees. The reason for setting the above angles is that consideration is given to manufacturing tolerances of general optical films.

The first half wave plate and the second half wave plate may be made of materials known in the art and are not particularly limited. For example, polyolefin (polyethylene, polypropylene, polynorbornene and the like), amorphous polyolefin, polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, polymethyl methacrylate, polymethacrylate, polyacrylate, polystyrene, cellulose-based polymer (such as triacetyl cellulose), PVA, epoxy resin, phenol resin, norbornene resin, polyester resin, acrylic resin, vinyl chloride resin, vinylidene chloride resin, etc., may be singly used or two or more thereof may be mixedly used, but this application is not limited thereto.

The first half wave plate and the second half wave plate may be obtained by forming the resin compositions and performing uniaxial or biaxial stretching. Further, as the first half wave plate and the second half wave plate, an alignment film in which a liquid crystalline polymer or a liquid crystalline monomer is aligned, may be used.

The first half wave plate and the second half wave plate are retarders in which the retardation is implemented as half, so that the relative phase difference between the e-ray and the o-ray becomes π. The phase difference may be represented as Δnd and the half wave plate may be manufactured by adjusting a thickness according to Δnd of a material.

The first quarter wave plate and the second quarter wave plate may be made of materials known in the art and is not particularly limited. For example, the quarter wave plate may be formed by a uniaxially stretched cycloolefin film, a uniaxially stretched polyethylene terephthalate film, a uniaxially stretched polycarbonate film, or a liquid crystal film.

The first quarter wave plate and the second quarter wave plate may be obtained by forming the resin compositions and performing uniaxial or biaxial stretching. Further, as the first quarter wave plate and the second quarter wave plate, an alignment film in which a liquid crystalline polymer or a liquid crystalline monomer is aligned may be used.

The first quarter wave plate and the second quarter wave plate are films made so that the relative phase difference between the e-ray and the o-ray becomes π/2. Linear polarization is made to be circular polarization or the circular polarization is made to be the linear polarization.

In an embodiment of this application, the positive C plate is provided between the first polarization rotation layer and the second polarization rotation layer.

In this application, the positive C plate means a film having a refractive index distribution of $n_z > n_x = n_y$. In this case, $n_x$ represents a refractive index in a direction in which a plane-direction refractive index of the film becomes maximum, $n_y$ represents a refractive index in a vertical direction in respects to an $n_x$ direction in a plane direction of the film, and $n_z$ represents a thickness-direction refractive index of the film.

The positive C plate may be known to the art and is not particularly limited. More specifically, the positive C plate may be prepared by aligning a polymer film using an appropriate method or may be prepared by coating a polymeric cholesteric liquid crystal compound on one surface of a substrate, aligning the polymer film in a predetermined direction, and then curing. When the polymerizable cholesteric liquid crystal compound is used, a zero retardation film may be used as the substrate. In this application, the zero retardation film means a film in which substantially no retardation does not occur even though light is transmitted.

The generally used positive C plate as a vertical alignment liquid crystal layer may mean a liquid crystal polymer layer comprising substantially vertically aligned liquid crystals and the polymer layer may represent so-called characteristics of the positive C plate. The characteristic of the positive C plate may mean that the refractive index $n_x$ in a slow axis direction is substantially equal to the refractive index $n_y$ in the slow axis direction and the refractive index $n_z$ in a thickness direction is larger than the refractive index $n_y$ in the slow axis direction ($n_z > n_y$). In the above description, the refractive index $n_x$ in the slow axis direction is substantially equal to the refractive index $n_y$ in the slow axis direction, and as a result, a case where there is a minute difference which occurs due to a process error, etc., is comprised in a scope of substantial equaling. Further, the vertical alignment liquid crystal layer may comprise some liquid crystals which are not vertically aligned if the vertical alignment liquid crystal layer shows the characteristics of the positive C plate. In addition, a dispersion characteristic may have a positive dispersion characteristic or a negative dispersion characteristic.

A thickness-direction retardation value $R_{th}$ of the positive C plate, which is represented by Equation 1 below in 550 nm may be in the range of 50 to 200 nm. Further, a front retardation value $R_o$ of the positive C plate, which is represented by Equation 2 below in 550 nm may be in the range of −5 to 5 nm or may be 0.

$$R_{th} = [n_z - (n_x + n_y)/2] \times d \quad \text{[Equation 1]}$$

$$R_o = (n_x - n_y) \times d \quad \text{[Equation 2]}$$

In Equations 1 and 2 above, $n_x$ represents a refractive index in a direction in which the plane-direction refractive index of the positive C plate becomes maximum, $n_y$ represents the refractive index in the vertical direction in respects to the $n_x$ direction in the plane direction of the positive C plate, $n_z$ represents the thickness-direction refractive index of the positive C plate, and d represents a thickness of the positive C plate.

When the retardation value deviates from the range, front black luminance is increased due to asymmetry of a viewing angle, and as a result, the CR may drop.

In an embodiment of this application, a first viewing angle compensation film may be additionally comprised between the second polarization rotation layer and the liquid crystal panel and the first viewing angle compensation film may comprise a negative B plate.

In this application, the negative B plate means a film having a refractive index distribution of $n_x > n_y > n_z$. In this case, $n_x$ represents a refractive index in a direction in which a plane-direction refractive index of the film becomes maximum, $n_y$ represents a refractive index in a vertical direction in respects to an $n_x$ direction in a plane direction of the film, and $n_z$ represents a thickness-direction refractive index of the film.

The thickness-direction retardation value $R_{th}$ of the negative B plate, which is represented by Equation 3 below in 550 nm may be in the range of −230 to −330 nm. Further, the front retardation value $R_o$ of the negative B plate, which is represented by Equation 4 below in 550 nm may be in the range of 10 to 110 nm.

$$R_{th}=[n_z-(n_x+n_y)/2] \times d \qquad \text{[Equation 3]}$$

$$R_o=(n_x-n_y) \times d \qquad \text{[Equation 4]}$$

In Equations 3 and 4 above, $n_x$ represents a refractive index in a direction in which the plane-direction refractive index of the negative B plate becomes the maximum, $n_y$ represents the refractive index in the vertical direction in respects to the $n_x$ direction in the plane direction of the negative B plate, $n_z$ represents the thickness-direction refractive index of the negative B plate, and d represents a thickness of the negative B plate.

In an embodiment of this application, a second viewing angle compensation film may be additionally provided between the liquid crystal panel and the lower polarizer and the second viewing angle compensation film may comprise a positive A plate and a negative C plate.

In this application, the positive A plate means a film having a refractive index distribution of $n_x > n_y = n_z$ and the negative C plate means a film having a refractive index distribution of $n_x = n_y > n_z$. In this case, $n_x$ represents a refractive index in a direction in which a plane-direction refractive index of the film becomes maximum, $n_y$ represents a refractive index in a vertical direction in respects to an $n_x$ direction in a plane direction of the film, and $n_z$ represents a thickness-direction refractive index of the film.

The front retardation value $R_o$ of the positive A plate, which is represented by Equation 5 below in 550 nm may be in the range of 90 to 190 nm.

$$R_o=(n_x-n_y) \times d \qquad \text{[Equation 5]}$$

In Equation 5 above, $n_x$ represents a refractive index in a direction in which the plane-direction refractive index of the positive A plate becomes the maximum, $n_y$ represents the refractive index in a vertical direction in respects to the $n_x$ direction in the plane direction of the positive A plate, and d represents a thickness of the positive A plate.

When the retardation value deviates from the range, the CR may drop due to the light leakage in a black state because retardation compensation of the vertically aligned liquid crystals is not completely made at a viewing angle.

The thickness-direction retardation value $R_{th}$ of the negative C plate, which is represented by Equation 6 below in 550 nm may be in the range of −160 to −260 nm. Further, the front retardation value $R_o$ of the positive C plate, which is represented by Equation 7 below in 550 nm may be in the range of −5 to 5 nm or may be 0.

$$R_{th}=[n_z-(n_x+n_y)/2] \times d \qquad \text{[Equation 6]}$$

$$R_o=(n_x-n_y) \times d \qquad \text{[Equation 7]}$$

In Equations 6 and 7 above, $n_x$ represents a refractive index in a direction in which the plane-direction refractive index of the negative C plate becomes maximum, $n_y$ represents the refractive index in the vertical direction in respects to the $n_x$ direction in the plane direction of the negative C plate, $n_z$ represents the thickness-direction refractive index of the negative C plate, and d represents a thickness of the negative C plate.

In an embodiment of this application, wave dispersibilities of the first half wave plate, the second λ/wave plate, the first quarter wave plate, and the second quarter wave plate may be independently constant dispersibility or flat dispersibility. In particular, in the case where each of the wave dispersibilities of the first half wave plate, the second λ/wave plate, the first quarter wave plate, and the second quarter wave plate is constant dispersibility, front CR characteristics may be more excellent as compared with the case where each wave dispersibility is flat dispersibility.

Constant dispersibility means a characteristic that as a wavelength of incident light increases, the generated retardation value decreases and flat dispersibility means a characteristic that a retardation value of a similar degree is generated regardless of the wavelength of the incident light.

In an embodiment of this application, a value of $R_o(450)/R_o(550)$ of the first quarter wave plate is preferably larger than a value of $R_o(450)/R_o(550)$ of the first half wave plate, and the value of $R_o(450)/R_o(550)$ of the second quarter wave plate is preferably larger than the value of $R_o(450)/R_o(550)$ of the second half wave plate. The $R_o(450)$ may mean the front retardation value in 450 nm, $R_o(550)$ mean the front retardation value in 550 nm, and the front retardation value $R_o$ may be represented by Equation 8 below.

$$R_o=(n_x-n_y) \times d \qquad \text{[Equation 8]}$$

In Equation 8 above, $n_x$ represents a refractive index in a direction in which the plane-direction refractive index of the first half wave plate, the second half wave plate, the first quarter wave plate, or the second quarter wave plate becomes maximum, $n_y$ represents the refractive index in the vertical direction in respects to the $n_x$ direction in the plane direction of the first half wave plate, the second half wave plate, the first quarter wave plate, or the second quarter wave plate, and d represents a thickness of the first half wave plate, the second half wave plate, the first quarter wave plate, or the second quarter wave plate.

More specifically, as an ideal value, each of the values of $R_o(450)/R_o(550)$ of the first quarter wave plate and the second quarter wave plate may be 1.21, and each of the values of $R_o(450)/R_o(550)$ of the first half wave plate and the second half wave plate may be 1.08.

In an embodiment of this application, the upper polarizer, the lower polarizer, the liquid crystal panel, the first half wave plate, the first quarter wave plate, the positive C plate, the second quarter wave plate, and the second half wave plate may be bonded by using a water-based adhesive or a UV curing adhesive or bonded by using a PSA adhesive.

In this application, the upper polarizer and the lower polarizer may be polyvinyl alcohol based polarizers in which at least one of iodine and dichroic dyes is individually dyed.

As an example of the method for preparing the polyvinyl alcohol based polarizer, a method comprising a step of preparing a polyvinyl alcohol polarizer in which iodine and/or a dichroic dye is dyed and a step of laminating a protective film on one surface of the polarizer may be used. For example, the method is not limited thereto, but the step of preparing the polyvinyl alcohol based polarizer may comprise a dyeing step of dying the polyvinyl alcohol based polymer film with the iodine and/or the dichroic dye, a cross-linking step of cross-linking the polyvinyl alcohol film and the dye, and a stretching step of stretching the polyvinyl alcohol film.

A film for protecting the polarizer refers to a transparent film attached on one surface of the polarizer and may adopt a film which is excellent in mechanical strength, thermal stability, moisture shielding property, isotropy, and the like. For example, an acetate based film such as triacetyl cellulose (TAC), polyester based, polyether sulfone based, polycarbonate based, polyamide based, polyimide based, polyolefin based, cycloolefin based, polyurethane based, and acryl based resin films may be used, but the present application is not limited thereto.

In addition, the protective film may be an isotropic film, may be an anisotropic film having an optical compensation function such as the phase difference, or may be composed of one sheet or may be composed of two or more sheets bonded together. Further, the protective film may be an unstretched, uniaxially or biaxially stretched film, and the thickness of the protective film is generally 1 to 500 μm and preferably 1 to 300 μm.

Meanwhile, in the step of laminating the protective film on one surface of the polyvinyl alcohol based polarizer, the protective film is bonded to the polarizer and the protective film may be bonded to the polarizer by using the adhesive. In this case, the bonding may be performed through a joining method of the film well known to the art and for example, the bonding may be performed by using adhesives well known to the art, which comprise the aqueous adhesive such as the polyvinyl alcohol based adhesive, a thermosetting adhesive such as the urethane based adhesive, etc., a photo-cation curable adhesive such as the epoxy based adhesive, etc., and optical radical curable adhesives such as the acryl based adhesive, etc.

The liquid crystal display according to an embodiment of the present application may additionally comprise a backlight unit. The backlight unit serves to supply light to the liquid crystal panel and a light source of the backlight unit may adopt any one of a cold cathode fluorescent lamp (CCFL), an external electrode fluorescent lamp (EEFL), a fluorescent lamp of a hot cold fluorescent lamp (HCFL), or a light emitting diode (LED).

In an embodiment of this application, the liquid crystal panel may be a vertical alignment (VA) mode liquid crystal panel.

The liquid crystal display according to an embodiment of this application may have the following structures, but is not limited only thereto.

1) Structure of the upper polarizer/the first half wave plate/the first quarter wave plate/the positive C plate/the second quarter wave plate/the second half wave plate/the liquid crystal panel/the lower polarizer 2) Structure of the upper polarizer/the first half wave plate/the first quarter wave plate/the positive C plate/the second quarter wave plate/the second half wave plate/negative B plate/the liquid crystal panel/the lower polarizer 3) Structure of the upper polarizer/the first half wave plate/the first quarter wave plate/the positive C plate/the second quarter wave plate/the second half wave plate/the liquid crystal panel/negative C plate/positive A plate/the lower polarizer Further, the types of other constituent elements constituting the liquid crystal display, for example, upper and lower substrates (e.g., color filter substrate or array substrate) are not also particularly limited, and the configurations known in this field may be adopted without the limitation.

EXAMPLES

Hereinafter, the present invention will be described in more detail with reference to examples. The following Examples are provided to aid understanding of the present invention and are not thus intended to limit the present invention.

EXAMPLES

Experimental Example 1

A first half wave plate having an optical axis of 15 degrees, a first quarter wave plate having an optical axis of 75 degrees, a positive C plate, a second quarter wave plate having an optical axis of 15 degrees, a second half wave plate having an optical axis of 75 degrees, and a negative B plate were sequentially laminated on the PVA layer having an absorption axis of 0 degree. The laminate was attached to an upper portion of a VA panel and a general polarizer having an absorption axis of 0 degree was configured to be positioned at an opposite side to the VA panel.

At this time, each of the first half wave plate and the second half wave plate had a wavelength dispersibility of $R_o(450)/R_o(550)=1.08$. Further, each of the first quarter wave plate and the second quarter wave plate had a wavelength dispersibility of $R_o(450)/R_o(550)=1.21$. That is, the first half wave plate and the second half wave plate had a wave dispersibility that was constant dispersibility, and the first quarter wave plate and the second quarter wave plate had a wave dispersibility that was constant dispersibility.

Further, the positive C plate had a thickness-direction retardation value of 140 nm and a front retardation value of 0. Further, the negative B plate had a thickness-direction retardation value of −280 nm and a front retardation value of 60 nm.

Figure 1:
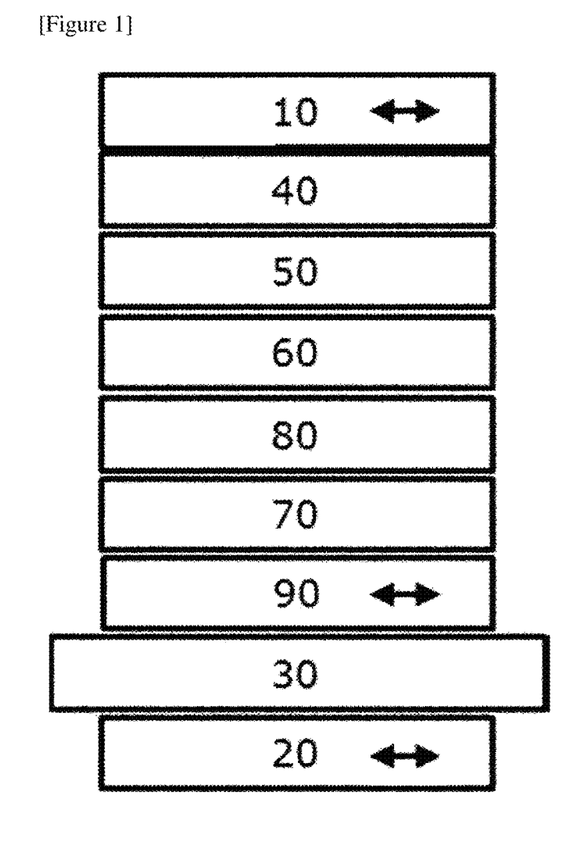
FIG. 1 is a schematic illustration of a structure of a liquid crystal display according to an embodiment of this application.

The structure of Experimental Example 1 was schematically illustrated in FIG. 1, wherein the structure having upper polarizer (10), lower polarizer (20), liquid crystal panel (30), first half wave plate (40), first quarter wave plate (50), positive C plate (60), second half wave plate (70), second quarter wave plate (80), and negative B plate (90), is shown.

Experimental Example 2

Experimental Example 1 was performed similarly to Experimental Example 1 except that a positive C plate having a thickness-direction retardation value of 182 nm and a front retardation value of 0 is are used.

Experimental Example 3

Experimental Example 3 was performed similarly to Experimental Example 1 except that a half wave plate whose wave dispersibility is $R_o(450)/R_o(550)=1$ was used as the first half wave plate, and the second half wave plate and a quarter wave plate whose wave dispersibility is $R_o$ (450)/R$_o$(550)=1 were used as the first quarter wave plate and the second quarter wave plate. That is, the first half wave plate and the second half wave plate had half wave plate whose a wave dispersibility that was flat dispersibility, and the first quarter wave plate and the second quarter wave plate had a wave dispersibility that was flat dispersibility.

Experimental Example 4

Experimental Example 4 was performed similarly to Experimental Example 1 except that the first quarter wave plate and the second quarter wave plate had a wavelength dispersibility of R$_o$(450)/R$_o$(550)=1.08.

Experimental Example 5

Figure 2:
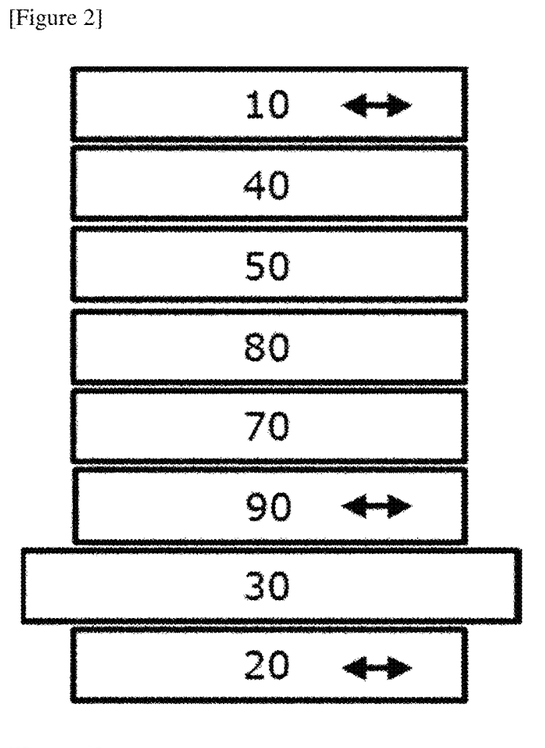
FIG. 2 is a schematic illustration of a structure of a liquid crystal display of Experimental Example 6 according to an embodiment of this application.

Like the structure of FIG. 2, Experimental Example 5 was performed similarly to Experimental Example 1 without using the positive C plate. FIG. 2 illustrates this structure wherein upper polarizer (10), lower polarizer (20), liquid crystal panel (30), first half wave plate (40), first quarter wave plate (50), second half wave plate (70), second quarter wave plate (80), and negative B plate (90), is shown.

With respect to Experimental Examples 1 to 5 above, a simulation was performed by using a Techwiz LCD 1D program.

Figure 3:
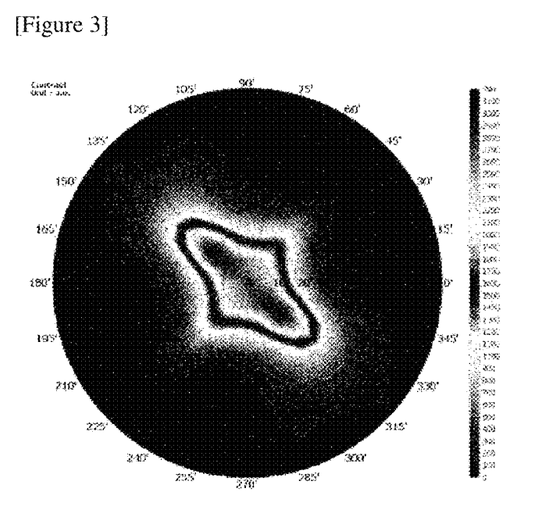
FIG. 3 is a diagram illustrating an omnidirectional CR of a liquid crystal display of Experimental Example 1.
Figure 4:
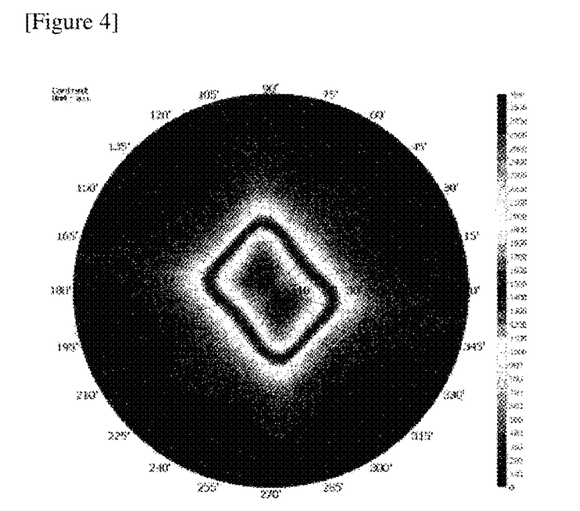
FIG. 4 is a diagram illustrating an omnidirectional CR of a liquid crystal display of Experimental Example 2.

Omnidirectional CRs of the liquid crystal display of Experimental Example 1 above were illustrated in FIG. 3 and omnidirectional CRs of the liquid crystal display of Experimental Example 2 above were illustrated in FIG. 4.

Figure 5:
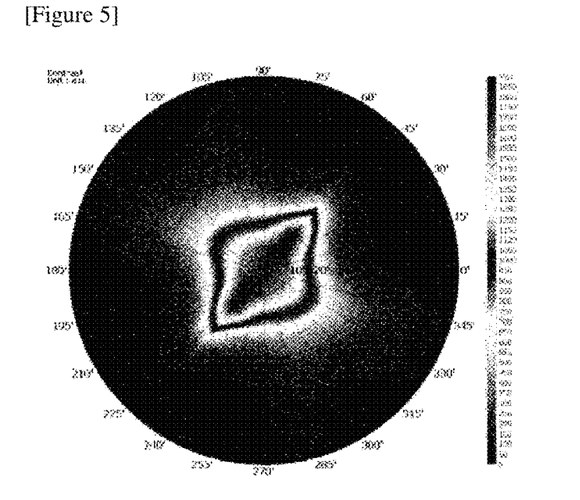
FIG. 5 is a diagram illustrating an omnidirectional CR of a liquid crystal display of Experimental Example 3.
Figure 6:
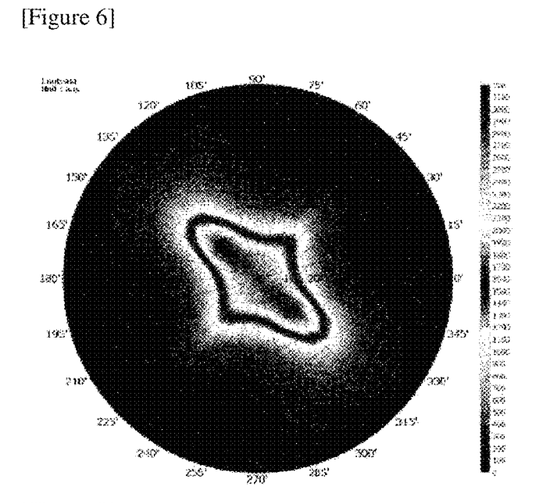
FIG. 6 is a diagram illustrating an omnidirectional CR of a liquid crystal display of Experimental Example 4.
Figure 7:
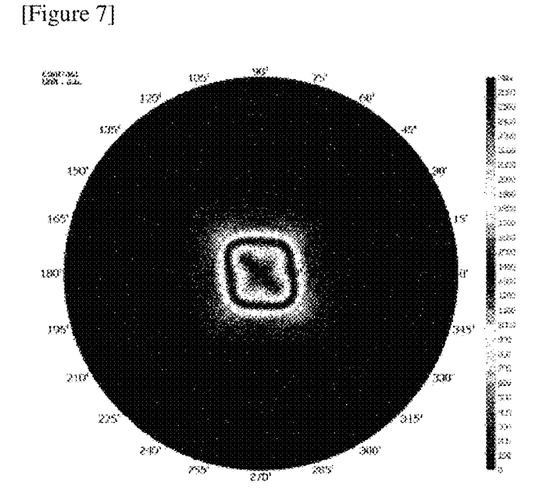
FIG. 7 is a diagram illustrating an omnidirectional CR of a liquid crystal display of Experimental Example 5.

Further, omnidirectional CRs of the liquid crystal display of Experimental Example 3 above were illustrated in FIG. 5, omnidirectional CRs of the liquid crystal display of Experimental Example 4 above were illustrated in FIG. 6, and omnidirectional CRs of the liquid crystal display of Experimental Example 5 above were illustrated in FIG. 7.

Further, front CRs of the liquid crystal displays of Experimental Examples 1 to 4 above were summarized in Table below.

TABLE 1

|  | Experimental Example 1 | Experimental Example 2 | Experimental Example 3 | Experimental Example 4 |
|---|---|---|---|---|
| Front CR | 162% | 153% | 100% | 62% |

Compared with Experimental Examples 1 and 3 above, it can be seen that in a case where the wave dispersibilities of the half wave plate and the quarter wave plate are the constant dispersibilities, front CR characteristics are excellent as compared with a case where the wave dispersibilities of the half wave plate and the quarter wave plate are the flat dispersibilities. Further, compared with Experimental Examples 1 and 4 above, it can be seen that in the case of a combination of the half wave plate and the quarter wave plate having the constant dispersibility, the front CR characteristics are excellent in a case where a ratio of R$_o$(450)/R$_o$(550) in the quarter wave plate is larger than that in the half wave plate. Further, as illustrated in FIGS. 2, 3, and 7, when the omnidirectional CRs of Experimental Examples 1, 2, and 5 are compared, it can be seen that viewing angle CR characteristics may be increased by adjusting the retardation value of the positive C plate and asymmetry depending on an azimuth angle may be adjusted.

Like the result, according to an embodiment of this application, absorption axes of the upper polarizer and the lower polarizer of the liquid crystal display are provided to be parallel to each other, thereby resolving a size limitation of the polarizer according to the width of the polarizer raw material.

Further, according to an embodiment of this application, a first polarization rotation layer, a positive C plate, and a second polarization rotation layer are comprised between an upper polarizer and a liquid crystal panel, and as a result, black luminance is reduced due to scattering of side light to increase a front contrast ratio (CR) as compared with a case where the first polarization rotation layer, the positive C plate, and the second polarization rotation layer are provided between a lower polarizer and the liquid crystal panel.

Further, according to an embodiment of this application, the positive C plate is provided between the first polarization rotation layer and the second polarization rotation layer to minimize reduction of the contrast ratio (CR) at the viewing angle.

The invention claimed is:
1. A laminate comprising:
a first polarization rotation layer;
a second polarization rotation layer; and
a positive C plate provided between the first polarization rotation layer and the second polarization rotation layer, wherein a thickness-direction retardation value R$_{th}$ of the positive C plate represented by Equation 1 below in 550 nm is 50 nm to 200 nm and a front retardation value R$_o$ represented by Equation 2 below in 550 nm is −5 nm to 5 nm:

$$R_{th}=[n_z-(n_x+n_y)/2]\times d \quad \text{[Equation 1]}$$

$$R_o=(n_x-n_y)\times d \quad \text{[Equation 2]}$$

In Equations 1 and 2 above,
n$_x$ represents a refractive index in a direction in which the plane-direction refractive index of the positive C plate becomes maximum,
n$_y$ represents a refractive index in a vertical direction in respects to the n$_x$ direction in the plane direction of the positive C plate,
n$_z$ represents the thickness-direction refractive index of the positive C plate, and
d represents a thickness of the positive C plate,
wherein the first polarization rotation layer comprises a first half wave plate and a first quarter wave plate, and
wherein the second polarization rotation layer comprises a second half wave plate and a second quarter wave plate.

2. The laminate of claim 1, wherein the first quarter wave plate of the first polarization rotation layer is provided on a surface of the positive C plate, and
the second quarter wave plate of the second polarization rotation layer is provided on an opposing surface of the positive C plate.

3. The laminate of claim 1, wherein a value of R$_o$(450)/R$_o$(550) of the first quarter wave plate is larger than a value of R$_o$(450)/R$_o$(550) of the first half wave plate,
the value of R$_o$(450)/R$_o$(550) of the second quarter wave plate is larger than the value of R$_o$(450)/R$_o$(550) of the second half wave plate, and
the R$_o$(450) means the front retardation value in 450 nm, R$_o$(550) mean the front retardation value in 550 nm, and the front retardation value R$_o$ is represented by Equation 8 below:

$$R_o=(n_x-n_y)\times d \quad \text{[Equation 8]}$$

In Equation 8 above, $n_x$ represents a refractive index in a direction in which the plane-direction refractive index of the first half wave plate, the second half wave plate, the first quarter wave plate, or the second quarter wave plate becomes maximum, $n_y$ represents a refractive index in a vertical direction in respects to the $n_x$ direction in the plane direction of the first half wave plate, the second half wave plate, the first quarter wave plate, or the second quarter wave plate, and d represents a thickness of the first half wave plate, the second half wave plate, the first quarter wave plate, or the second quarter wave plate.

4. A liquid crystal display comprising:

an upper polarizer;

a lower polarizer;

a liquid crystal panel provided between the upper polarizer and the lower polarizer, wherein the upper polarizer and the lower polarizer are provided such that absorption axes thereof are parallel to each other;

a first polarization rotation layer, a positive C plate, and a second polarization rotation layer sequentially provided between the upper polarizer and the liquid crystal panel, wherein a thickness-direction retardation value $R_{th}$ of the positive C plate represented by Equation 1 below in 550 nm is 50 nm to 200 nm and a front retardation value $R_o$ represented by Equation 2 below in 550 nm is −5 nm to 5 nm:

$$R_{th}=[n_z-(n_x+n_y)/2] \times d \qquad \text{[Equation 1]}$$

$$R_o=(n_x-n_y) \times d \qquad \text{[Equation 2]}$$

In Equations 1 and 2 above, $n_x$ represents a refractive index in a direction in which the plane-direction refractive index of the positive C plate becomes maximum, $n_y$ represents a refractive index in a vertical direction in respects to the $n_x$ direction in the plane direction of the positive C plate, $n_z$ represents the thickness-direction refractive index of the positive C plate, and d represents a thickness of the positive C plate, wherein the first polarization rotation layer comprises a first half wave plate and a first quarter wave plate, and wherein the second polarization rotation layer comprises a second half wave plate and a second quarter wave plate, and wherein the liquid crystal panel is a vertical alignment liquid crystal mode.

5. The liquid crystal display of claim 4, wherein the first quarter wave plate of the first polarization rotation layer is provided on a surface of the positive C plate, and the second quarter wave plate of the second polarization rotation layer is provided on an opposing surface of the positive C plate.

6. The liquid crystal display of claim 4, wherein an angle formed between an optical axis of the first half wave plate of the first polarization rotation layer and an absorption axis of the upper polarizer, is 10 degrees to 20 degrees, and an angle formed between an optical axis of the first quarter wave plate of the first polarization rotation layer and the absorption axis of the upper polarizer is 70 degrees to 80 degrees.

7. The liquid crystal display of claim 4, wherein an angle formed between an optical axis of the second quarter wave plate of the second polarization rotation layer and an absorption axis of the upper polarizer is 10 degrees to 20 degrees, and the angle formed between an optical axis of the second half wave plate of the second polarization rotation layer and the absorption axis of the upper polarizer is 70 degrees to 80 degrees.

8. The liquid crystal display of claim 4, further comprising:

a first viewing angle compensation film between the second polarization rotation layer and the liquid crystal panel.

9. The liquid crystal display of claim 8, wherein the first viewing angle compensation film comprises a negative B plate.

10. The liquid crystal display of claim 9, wherein a thickness-direction retardation value $R_{th}$ of the negative B plate represented by Equation 3 below in 550 nm is −230 nm to −330 nm and a front retardation value $R_o$ represented by Equation 4 below in 550 nm is 10 nm to 110 nm:

$$R_{th}=[n_z-(n_x+n_y)/2] \times d \qquad \text{[Equation 3]}$$

$$R_o=(n_x-n_y) \times d \qquad \text{[Equation 4]}$$

In Equations 3 and 4 above, $n_x$ represents a refractive index in a direction in which the plane-direction refractive index of the negative B plate becomes maximum, $n_y$ represents a refractive index in a vertical direction in respects to the $n_x$ direction in the plane direction of the negative B plate, $n_z$ represents the thickness-direction refractive index of the negative B plate, and d represents a thickness of the negative B plate.

11. The liquid crystal display of claim 4, further comprising:

a second viewing angle compensation film between the liquid crystal panel and the lower polarizer.

12. The liquid crystal display of claim 11, wherein the second viewing angle compensation film comprises a positive A plate and a negative C plate.

13. The liquid crystal display of claim 12, wherein the front retardation value $R_o$ of the positive A plate, which is represented by Equation 5 below in 550 nm is 90 nm to 190 nm:

$$R_o=(n_x-n_y) \times d \qquad \text{[Equation 5]}$$

In Equation 5 above, $n_x$ represents a refractive index in a direction in which the plane-direction refractive index of the positive A plate becomes maximum, $n_y$ represents a refractive index in a vertical direction in respects to the $n_x$ direction in the plane direction of the positive A plate, and d represents a thickness of the positive A plate.

14. The liquid crystal display of claim 12, wherein a thickness-direction retardation value $R_{th}$ of the negative C plate represented by Equation 6 below in 550 nm is −160 nm to −260 nm and a front retardation value $R_o$ represented by Equation 7 below in 550 nm is −5 nm to 5 nm:

$$R_{th}=[n_z-(n_x+n_y)/2] \times d \qquad \text{[Equation 6]}$$

$$R_o=(n_x-n_y) \times d \qquad \text{[Equation 7]}$$

In Equations 6 and 7 above, $n_x$ represents a refractive index in a direction in which the plane-direction refractive index of the negative C plate becomes maximum, $n_y$ represents a refractive index in a vertical direction to respects to the $n_x$ direction in the plane direction of the negative C plate, $n_z$ represents the thickness-direction refractive index of the negative C plate, and d represents a thickness of the negative C plate.

15. The liquid crystal display of claim 4, wherein each wave dispersibility of the first half wave plate, the second half wave plate, the first quarter wave plate, and the second quarter wave plate, is a constant dispersibility.

16. The liquid crystal display of claim 4, wherein a value of $R_o(450)/R_o(550)$ of the first quarter wave plate is larger than a value of $R_o(450)/R_o(550)$ of the first half wave plate, the value of $R_o(450)/R_o(550)$ of the second quarter wave plate is larger than the value of $R_o(450)/R_o(550)$ of the second half wave plate, and the $R_o(450)$ means the front retardation value in 450 nm, $R_o(550)$ mean the front retardation value in 550 nm, and the front retardation value $R_o$ is represented by Equation 8 below:

$$R_o = (n_x - n_y) \times d \quad \text{[Equation 8]}$$

In Equation 8 above, $n_x$ represents a refractive index in a direction in which the plane-direction refractive index of the first half wave plate, the second half wave plate, the first quarter wave plate, or the second quarter wave plate becomes maximum, $n_y$ represents a refractive index in a vertical direction in respects to the $n_x$ direction in the plane direction of the first half wave plate, the second half wave plate, the first quarter wave plate, or the second quarter wave plate, and d represents a thickness of the first half wave plate, the second half wave plate, the first quarter wave plate, or the second quarter wave plate.

17. The liquid crystal display of claim 4, wherein the upper polarizer and the lower polarizer are polyvinyl alcohol based polarizers in which at least one of iodine and dichroic dyes is individually dyed.

18. The liquid crystal display of claim 4, wherein the liquid crystal panel is a vertical alignment (VA) mode liquid crystal panel.

* * * * *